(12) United States Patent
He et al.

(10) Patent No.: US 7,708,800 B2
(45) Date of Patent: May 4, 2010

(54) METAL NANOPARTICLE WITH SUPPORT, CONTINUOUS METAL NANOPARTICLE BODY, AND METHODS FOR PRODUCING THESE

(75) Inventors: Junhui He, Wako (JP); Toyoki Kunitake, Wako (JP)

(73) Assignee: Riken, Wako-Shi (JP)

( * ) Notice: Subject to any disclaimer, the term of this patent is extended or adjusted under 35 U.S.C. 154(b) by 505 days.

(21) Appl. No.: 10/558,306

(22) PCT Filed: May 28, 2004

(86) PCT No.: PCT/JP2004/007764

§ 371 (c)(1),
(2), (4) Date: Dec. 11, 2006

(87) PCT Pub. No.: WO2004/106224

PCT Pub. Date: Dec. 9, 2004

(65) Prior Publication Data

US 2007/0101825 A1    May 10, 2007

(30) Foreign Application Priority Data

May 29, 2003    (JP)    ............................. 2003-153016

(51) Int. Cl.
*B22F 9/24* (2006.01)
(52) U.S. Cl. ................. 75/346; 75/365; 75/370
(58) Field of Classification Search ............. 75/371
See application file for complete search history.

(56) References Cited

U.S. PATENT DOCUMENTS 4,256,609 A    3/1981    Dale et al.

| 4,476,242 A | 10/1984 | Puskas et al. |
| 6,875,253 B2* | 4/2005 | Daimon et al. ................. 75/255 |
| 2003/0203242 A1* | 10/2003 | Waki et al. ............ 428/694 BR |
| 2004/0074336 A1 | 4/2004 | Daimon et al. |
| 2004/0261574 A1* | 12/2004 | Lin et al. ...................... 75/364 |

FOREIGN PATENT DOCUMENTS

| CA | 2308302 | 5/1999 |
| JP | 06-287355 A | 10/1994 |
| JP | 2001-093414 A | 4/2001 |
| WO | WO-99/21652 A2 | 5/1999 |
| WO | WO-02/062509 A1 | 8/2002 |

OTHER PUBLICATIONS

Junhui He et al., "Facile In Situ Synthesis of Noble Metal Nanoparticles in Porous Cellulose Fibers", Chem.Mater., Nov. 18, 2003, vol. 15, No. 23, pp. 4401-4406; full text.

(Continued)

*Primary Examiner*—George Wyszomierski
(74) *Attorney, Agent, or Firm*—Birch, Stewart, Kolasch & Birch, LLP

(57) ABSTRACT

There is disclosed a method for producing a supported metal nanoparticle, which has the steps of adsorbing a metal ion-containing compound to a support of an organic material and reducing the adsorbed metal ion to form a metal nanoparticle on the support. In the producing method, by using a various organic material as a matrix, the metal nanoparticle can be easily formed in situ with excellent accuracy from the metal ion-containing compound.

3 Claims, 8 Drawing Sheets

OTHER PUBLICATIONS

Shin Horiuchi et al., "Three-Dimensional Nanoscale Alignment of Metal Nanoparticles Using Block Copolymer Films as Nanoreactors", Langmuir, Apr. 1, 2003, vol. 19, No. 7, pp. 2963-2973; full text.

Il-Wun Shim et al., "Preparation of Copper Nanoparticles in Cellulose Acetate Polymer and the Reaction Chemistry of Copper Complexes in the Polymer", Bull.Korean Chem. Soc., Apr. 20, 2004, vol. 23, No. 4, pp. 563-566; full text.

Kotel' Nikova et al., "Mechanisms of Diffusion-Reduction Interaction Of Microcrystalline Cellulose and Silver Ions", Russian Journal of General Chemistry, vol. 73, No. 3, 2003, pp. 427-433.

English abstract of JP-6287355-A, Oct. 11, 1994, Database WPI Week 199445, Thomson Scientific, London, GB., XP-002544094.

European Search Report dated Sep. 21, 2009 for European Application No. 04735351.1.

* cited by examiner

METAL NANOPARTICLE WITH SUPPORT, CONTINUOUS METAL NANOPARTICLE BODY, AND METHODS FOR PRODUCING THESE

TECHNICAL FIELD

The present invention relates to a supported metal nanoparticle comprising a metal nanoparticle and an organic material support carrying the nanoparticles, a continuous metal nanoparticle body, and methods for producing them. More particularly, the invention relates to methods capable of producing a uniform metal nanoparticle with a matrix of an organic component support and a continuous metal nanoparticle body easily with low costs, and a supported metal nanoparticle and a continuous metal nanoparticle body produced by the methods.

BACKGROUND ART

It has recently been reported that inorganic compound materials having size, thickness, shape, etc. controlled at nanometer scales (hereinafter referred to as nano scales) can remarkably improve chemical, mechanical, and optical properties of surfaces. Then nanotechnology has actively been studied in the fields of fluorescent materials, magnetic materials, production of various sensors, high-density electronic devices, etc. To create such nano materials, bottom-up synthesis processes from atoms and molecules are needed. Particularly, technologies for designing composition and structure of metal nanoparticles and ultrathin films at a molecular or atomic level can be important, fundamental technologies in various fields.

Known methods for synthesizing the metal nanoparticles controlled at nano scales include methods of reducing metal ions under the presence of stabilizers in uniform solutions, and methods of reducing metal ions in matrixes of uniform polymers.

For example, a method of temporarily using a stabilizer and a reducing agent to produce a metal microparticle has been known (JP-A-2002-146235, claim 11 and Paragraphs [0013] to [0028]). This method can produce a noble metal-containing microparticle having a low impurity content sufficiently for use in fuel cells. However, this method comprises the complicated steps of adding the stabilizer and the reducing agent and removing the added stabilizer and reducing agent, whereby the method cannot be a simple method of producing the metal nanoparticles.

Further, a method of producing a metal nanoparticle in a polymer having a polar group has been known (JP-A-9-188778, claims 1 to 13 and Paragraphs [0007] to [0028]). However, in this method, a metal ion has to undergo ion exchange in the polymer, whereby the polymer must have an ion-exchangeable polar group. Thus, the polymer used in this method is limited, and polymers with no ion-exchangeable polar groups cannot be used.

The inventors have developed a method for easily synthesizing a metal nanoparticle using a metal oxide in a support (He, Kunitake, et al., "*In Situ Synthesis of Nobel Metal Nanoparticles in Ultrathin TiO$_2$-Gel Films by a Combination of Ion-Exchange and Reduction Processes*", Langmuir, 2002, 18, pp 10005-10010). However, the support used in this method is not an organic component support but a TiO$_2$ thin film. Further, a metal ion has to be exchanged also in this method like JP-A-9-188778, so that the method has a disadvantage of restriction in the matrix.

As described above, a satisfactory method capable of certainly forming a metal nanoparticle from an easily-available, natural or synthetic, organic material with ease and excellent accuracy has not been developed. Under such circumstances, an object of the present invention is to provide a supported metal nanoparticle and a method for producing the same, wherein a metal nanoparticle can be easily obtained in situ with excellent accuracy using a various natural or synthetic organic material as a matrix. Another object of the invention is to provide a continuous metal nanoparticle body easily produced using a natural or synthetic organic material and a method for producing the same.

DISCLOSURE OF THE INVENTION

The inventors have found that, even in the case of using a natural or synthetic organic material for a support, a metal ion can be adsorbed to the support under mild conditions and then can be reduced in situ to easily produce a metal nanoparticle on the support. Further, the inventors have found that a continuous metal nanoparticle body having a three-dimensional structure can be easily produced by treating the supported metal nanoparticle under a predetermined condition. The present invention has been accomplished by these findings.

Thus, the object of the invention is achieved by a method for producing a supported metal nanoparticle and a supported metal nanoparticle obtained by the method, the method being characterized by the fact that it comprises adsorbing a metal ion-containing compound to a support comprising an organic material (step A) and reducing the adsorbed metal ion-containing compound to form a metal nanoparticle on the support (step B).

Further, the another object of the invention is achieved by a method for producing a continuous metal nanoparticle body and a continuous metal nanoparticle body obtained by the method, the method being characterized by the fact that it comprises adsorbing a metal ion-containing compound to a support comprising an organic material (step A), reducing the adsorbed metal ion-containing compound to form metal nanoparticles on the support (step B), and removing the support to form a continuous metal nanoparticle body by at least one treatment selected from oxygen plasma treatments, ozone oxidation treatments, and burning treatments (step C).

The producing methods of the invention may comprise subjecting the support to a carbonization treatment (step D), and the step D is preferably carried out after the step B. In the producing methods of the invention, the adsorbing step is preferably carried out such that the support is soaked in a solution containing the metal ion-containing compound. Further, in the producing methods of the invention, it is preferred that a metal salt or a metal complex compound is used as the metal ion-containing compound. Furthermore, in the producing methods of the invention, it is preferred that a porous substrate is used as the support in the step A.

In the supported metal nanoparticle of the invention, the metal nanoparticle preferably has an average particle diameter of 1 to 100 nm and preferably has electrical conductivity. Further, the continuous metal nanoparticle body of the invention preferably has a shape that is formed using the support as a mold.

In the producing method of the invention, the supported metal nanoparticle can be certainly produced with ease with excellent accuracy using a matrix of an easily-available, low-cost, natural or synthetic, organic material in the support. Further, in the producing method of the invention, a supported electroconductive metal nanoparticle can be easily produced at low costs by using a carbon support as a matrix.

Additionally, in the producing method of the invention, the continuous metal nanoparticle body having a shape corresponding to that of the support mold can be inexpensively produced with ease only by the steps of adsorbing the metal ion-containing compound to the support, reducing the compound, and then removing the support.

DETAILED DESCRIPTION OF THE INVENTION

Figure 1:
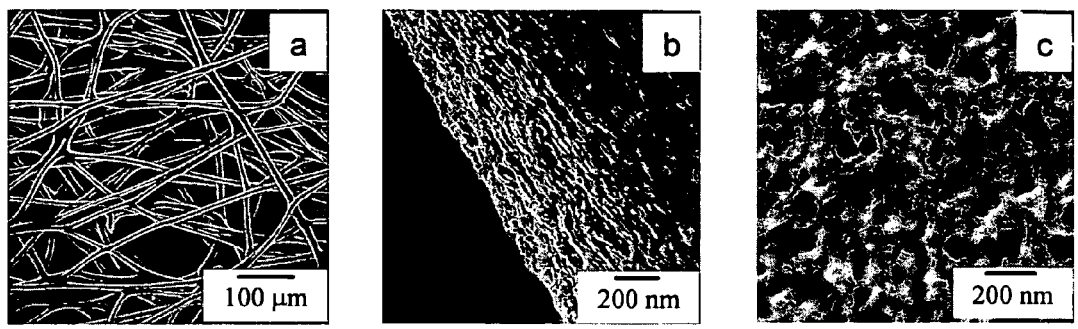
FIG. 1 shows transmission electron microscope images of a cellulose sheet used in Example 1. (a) is a transmission electron microscope image of a section of the cellulose sheet, (b) is an enlarged image of the cellulose sheet (a part of the cellulose sheet), and (c) is an enlarged image of the cellulose sheet (a surface of a cellulose fiber).

The supported metal nanoparticle, the producing method thereof, the continuous metal nanoparticle body, and the producing method thereof of the present invention are described below.

It should be noted that, in this description, the term "numeric value to numeric value" means a number range including both the numeric values as the minimum value and maximum value. Further, in this description, the term "a metal ion-containing compound is adsorbed to a support" means that a chemical bond (such as a covalent bond, a hydrogen bond, and a coordinate bond), an electrostatic bond (such as an ionic bond), or a physical bond is formed between the metal ion-containing compound and a reactive group (preferably a hydroxyl group or a carboxyl group) disposed in or on the support, whereby the metal ion-containing compound is connected to the support, and does not means that ion exchange is caused on the support. Furthermore, in this description, the term "a continuous metal nanoparticle body" means a body comprising one or more types of metal nanoparticles that are welded or fused each other to be continuously connected.

[Method for Producing Supported Metal Nanoparticle and Supported Metal Nanoparticle]

The producing method of the invention comprises adsorbing a metal ion-containing compound to a support comprising an organic material (step A), and reducing the adsorbed metal ion-containing compound to form a metal nanoparticle on the support (step B).

<Step A>

The support used in the producing method of the invention is not particularly limited as long as it comprises an organic material capable of adsorbing the metal ion-containing compound. For example, in the invention, the support may comprise a natural or synthetic organic material having a reactive group, preferably a hydroxyl group or a carboxyl group, on the surface. The support is preferably a porous substrate having a plurality of inner pores. Examples of materials for such a support include various organic materials of filter papers, cellulose sheets, threads such as cotton threads and woolen threads, cloths such as cotton cloths, cotton fabrics, and woolen cloths, fibers, wood chips, bamboo materials, synthesis polymer sheets and cloths, and carbon materials such as charcoals. The support preferably comprises a cellulose sheet or a cotton cloth having a large number of reactive groups on the surface. Further, in the producing method of the invention, the support may be carbonized by a carbonization treatment (step D) to be hereinafter described.

There are no particular restrictions on the size, shape, structure, etc. of the support used in the producing method of the invention. In the producing method of the invention, the support is not needed to have a flat surface to adsorb the metal ion-containing compound, and the material and shape of the support may be appropriately selected. For example, the support may have a various shape of plate, fiber, bead, powder, flake, etc., and may have a large area. It is preferred that the support be in a film shape from the viewpoint of producing and practically using a continuous metal nanoparticle body.

When the support does not have the reactive group (preferably a hydroxyl or carboxyl group) on the surface (on the surface and in the pores of a porous support), a reactive group may be introduced to the surface of the support to use it in the invention. The reactive group (a hydroxyl group or carboxyl group) may be introduced to the surface of the support by a known hydroxyl or carboxyl group introducing method.

The amount of the reactive group (preferably a hydroxyl or carboxyl group), which is present or introduced in or on the support, per unit area affects the density of the metal nanoparticles formed in the support, production efficiency, etc. For example, in the case of forming a large number of metal nanoparticles on the support, the amount of the reactive group (preferably a hydroxyl or carboxyl group) is appropriately $5.0 \times 10^{13}$ to $5.0 \times 10^{14}$ equivalent/cm$^2$, preferably $1.0 \times 10^{14}$ to $2.0 \times 10^{14}$ equivalent/cm$^2$.

The metal ion-containing compound for use in the producing method of the invention is not particularly limited as long as it can be a cationic or coordinating metal compound in water. Examples of metal salt compounds of the metal ion-containing compounds, which can generate cations in water, include first row transition metal salts such as chromium nitrate ($Cr(NO_3)_3$), manganese nitrate ($Mn(NO_3)_2$), iron nitrate ($Fe(NO_3)_3$), and cobalt nitrate ($Co(NO_3)_2$), second row transition metal salts such as palladium nitrate ($Pd(NO_3)_2$), silver nitrate ($AgNO_3$), and cadmium nitrate ($Cd(NO_3)_2$), lanthanoid metal salts such as lanthanum nitrate ($La(NO_3)_3$) and gadolinium nitrate ($Gd(NO_3)_3$), alkaline earth metal salts such as barium nitrate ($Ba(NO_3)_2$) and calcium nitrate ($Ca(NO_3)_2$), and alkaline metal salts such as potassium nitrate ($KNO_3$) and lithium nitrate ($LiNO_3$). Also metal chlorides having coordinating properties such as gold trichloride ($AuCl_3$), platinum chloride ($PtCl_3$), platinum (II) chloride ($PtCl_4$), and palladium chloride ($PdCl_3$) may be preferably used. The counter anions of the compounds that generate cationic metal ions in water are not particularly restricted. Also a dilute solution of sodium hydroxide (NaOH) may be used as the metal ion compound in the invention. Further, a metal complex compound such as $[Cu(NH_3)_4]^{2+}$, $[Fe(NH_3)_6]^{3+}$, and $[Co(NH_3)_4]^{2+}$ may be used in the producing method of the invention.

In the producing method of the invention, the above metal ion-containing compounds may be used in combination of two or more if necessary. A composite metal nanoparticle can be formed by combining different types of metal ions.

In the producing method of the invention, a solvent for dissolving the metal ion-containing compound is not particularly limited as long as the metal ion-containing compound (such as the metal salt and the metal complex compound) can be dissolved therein to generate a metal ion, a metal complex, or a coordinating metal compound. For example, water, toluene, THF, methanol, ethanol, chloroform, hexane, DMF, DMSO, etc. can be used singly or in combination as the solvent.

The concentration of the metal ion-containing compound affects the average particle diameter and dispersion of the metal nanoparticles, and may be appropriately determined depending on the desired particle diameter of the metal nanoparticles. The concentration of the metal ion-containing compound is preferably 1 to 100 mM, more preferably about 10 mM.

In the step A, the method of adsorbing the metal ion-containing compound to the support is not particularly limited. For example, the adsorbing process may be carried out such that the support is soaked in a solution containing the metal ion-containing compound to adsorb the compound to the surface or the pores of the support, or that the porous support is soaked in the solution and the solution is aspirated through the pores of the support under reduced pressure. The step A may be repeated depending on the amount of the metal ion-containing compound to be adsorbed without particular restrictions.

Generally the process of adsorbing the metal ion-containing compound in the step A may be carried out at 0 to 100° C. for 1 minutes to several hours though the adsorption time and the adsorption temperature depends on the type and properties of the metal ion-containing compound and cannot unconditionally limited.

<Step B>

The producing method of the invention comprises reducing the metal ion-containing compound adsorbed to the support in the step A to form a metal nanoparticle on the support (step B).

In the step B, the metal ion-containing compound may be reduced by a known reduction method without particular restrictions. For example, a reducing agent may be used in the reduction, and examples thereof include sodium borohydride ($NaBH_4$), potassium borohydride ($KaBH_4$), lithium aluminum hydride ($LiAlH_3$), alcohols such as glycol, ethanol, propanol, and isopropanol, hydrogen iodide (HI), and secondary or tertiary amine compounds such as hydroxylamine, hydrazine compounds, dimethylaminoethanol, and dimethylethylamine. The reduction may be achieved by a treatment in a reducing atmosphere of hydrogen, carbon monoxide, etc., hydrogen plasma, or light irradiation. The concentration of the reducing agent, the strength of the hydrogen plasma, the type of the light source, the light intensity, the reduction time, the reduction temperature, etc. may be those of known reduction methods.

In the reduction reaction in the solution, a basic compound such as sodium hydroxide and ammonium hydroxide, a pH adjuster such as an inorganic or organic acid, an oxycarbonic acid such as sodium citrate and sodium acetate, a buffer agent such as boron, an inorganic acid of carbonic acid, etc., an organic acid, and an inorganic acid alkali salt, an accelerating agent such as a sulfide and a fluoride, a stabilizer such as a chloride, a sulfide, and a nitrate, a modifier such as a surfactant, etc., may be added to the reaction system within the scope of the invention. Also in the method of heat treatment in the reducing atmosphere, an inert gas such as nitrogen, argon, and helium may be used in combination.

<Step D>

The producing method of the invention may comprise subjecting the support to a carbonization treatment in addition to the steps A and B (step D). The carbonization treatment in the step D may be achieved by a known carbonization method. The conditions of the carbonization treatment may be appropriately determined depending on the types of the metal ion-containing compound and the support. For example, the support may be carbonized in an atmosphere of an inert gas (preferably a nitrogen gas) by heating to a temperature of 150 to 500° C. at a heating rate of 1 to 100° C./minute, preferably by heating to a temperature of 180 to 450° C. at a heating rate of 5 to 70° C./minute, more preferably by heating to a temperature of 200 to 400° C. at a heating rate of 5 to 20° C./minute. When the temperature is 150 to 500° C. in the carbonization treatment, the carbonization is properly carried out such that the support is not decomposed, the metal ion-containing compound or the metal nanoparticle shows excellent adsorption properties, and the resultant carbon support has a sufficient strength.

The step D may be carried out as an after treatment of the step A or B. In a case where the step D is carried out after the step A, the support to which the metal ion-containing compound is adsorbed is subjected to the carbonization treatment, resulting in a carbon support carrying the metal ion-containing compound. On the other hand, in a case where the step D is carried out after the step B, the support to which the metal nanoparticle is adsorbed is subjected to the carbonization treatment, resulting in a carbon support carrying the metal nanoparticle.

It should be noted that, in this description, the term "a carbon support" means a carbonaceous solid support obtained by heat-treating the support of the organic material to decompose the organic material and remove hydrogen and low-molecular gas decomposition products.

The carbon support carrying the metal nanoparticles can be used as the support in the step A. In this case, the same or different metal ion-containing compound may be further adsorbed to the support. The carbon support carrying the metal nanoparticle can have an electrical conductivity (an electrically conductive property), and can be observed by a scanning electron microscope without metal coatings. Examples of such carbon supports include electroconductive carbon films derived from cellulose, etc.

The metal nanoparticle contained in the supported metal nanoparticle obtained by the method of the invention is a microparticle of a metal (or a metal oxide) having a nano diameter, and the average particle diameter depends on the concentration of the metal ion-containing compound. The average particle diameter of the metal nanoparticle is preferably 1 to 100 nm, more preferably 1 to 50 nm, further preferably 1 to 20 nm. The metal nanoparticle shows an excellent particle diameter distribution on the support, and for example the standard deviation a may be 0.1 to 5 nm, preferably 0.1 to 3 nm.

[Method for Producing Continuous Metal Nanoparticle Body and Continuous Metal Nanoparticle Body]

The method of the invention for producing a continuous metal nanoparticle body comprises the step C of removing the support from the supported metal nanoparticle obtained by the above steps A and B by at least one treatment selected from oxygen plasma treatments, ozone oxidation treatments, and burning treatments. The steps A and B are as described above, and the step C is described in detail here.

<Step C>

The method of the invention comprises removing the support to form the continuous metal nanoparticle body by at least one treatment selected from the oxygen plasma treatments, ozone oxidation treatments, and burning treatments (step C). By removing the support in the step C, the metal nanoparticles on the support are welded or fused with each other, to form the continuous metal nanoparticle body.

The term "the metal nanoparticles are welded each other" means that a plurality of the metal nanoparticles are connected to each other and form one continuous body in the partially original forms. On the other hand, the term "the metal nanoparticles are fused each other" means that a plurality of the metal nanoparticles form one continuous body without the original forms.

In the method of the invention, the treatment may be appropriately selected from the oxygen plasma treatments, the ozone oxidation treatments, and the burning treatments depending on the properties of the metal nanoparticles on the support. For example, the time, pressure, output, and temperature of the oxygen plasma treatment may be properly determined depending on the type of the support to be oxygen plasma-treated, the particle diameter of the metal nanoparticles, and the plasma source. Specifically, it is appropriate that the pressure in the oxygen plasma treatment is 1.33 to 66.5 Pa (10 to 500 mtorr), preferably 13.3 to 26.6 Pa (100 to 200 mtorr). It is appropriate that the plasma output in the oxygen plasma treatment is 5 to 500 W, preferably 10 to 50 W. It is appropriate that the treatment time of the oxygen plasma treatment is 5 minutes to several hours, preferably 5 to 60 minutes. Further, it is appropriate that the temperature in the oxygen plasma treatment is low, preferably −30 to 300° C., more preferably 0 to 100° C., the most preferably room temperature (5 to 40° C.).

A plasma apparatus for the oxygen plasma treatment is not particularly limited, and may be PE-2000 Plasma Etcher manufactured by South Bay Technology, USA, etc.

It is appropriate that the burning treatment is carried out in the air at 100 to 1000° C., preferably 300 to 500° C., for 30 seconds to 1 hour, preferably 1 to 20 minutes.

The conditions of the ozone oxidation treatment may be appropriately determined depending on the properties of the support to be treated and an apparatus for the treatment. For example, it is appropriate that the pressure in the ozone oxidation treatment is atmospheric pressure to 13.3 Pa (100 mTorr), preferably 0.013 to 13.3 Pa (0.1 to 100 mTorr). The time of the ozone oxidation treatment may be several minutes to several hours, preferably 5 to 60 minutes. The treatment temperature may be room temperature to 600° C., preferably room temperature to 400° C.

The continuous metal nanoparticle body obtained by the method of the invention may have a linear (one-dimensional), planar (two-dimensional), or steric (three-dimensional) structure. The continuous body preferably has a thin line structure or a thin film structure.

In a case where the continuous metal nanoparticle body of the invention has a thin line structure, the width may be 2 to 200 nm, preferably 2 to 20 nm, more preferably 2 to 10 nm. The ratio of the length to the width (the length/width ratio) of the linear continuous body, i.e. the axial ratio, is preferably 10 or more, more preferably 1,000 or more, most preferably 10,000 or more.

The continuous metal nanoparticle body of the invention can have a shape corresponding to that of the support because the metal nanoparticles supported are welded or fused with each other along the shape of the support by the oxygen plasma treatment, etc. Thus, the continuous metal nanoparticle body of the invention can be shaped using the support as a mold. For example, in the case of using a filter paper or a thread as the support, the continuous metal nanoparticle body obtained by the producing method of the invention can have a shape of a porous sheet or a twisted thread.

In the case of using 2 or more types of the metal nanoparticles, the continuous metal nanoparticle body of the invention can be a continuous composite metal nanoparticle body.

According to the methods of the invention, the supported metal nanoparticle, which comprises the metal nanoparticle and the natural or synthetic organic material support carrying the nanoparticle, can be obtained. The supported metal nanoparticle can be used as a thin film material comprising high-dispersion magnetic particles, a thin film material having a plasmon absorption, etc. Further, by using the carbonized support, the carbon supported metal nanoparticle having electrical conductivity (e.g. a carbon cellulose sheet-having platinum nanoparticle with electrical conductivity) can be easily produced, and it is useful as a catalyst for fuel cells.

Further, according to the producing method of the invention, the continuous body of the metal nanoparticles can be formed, whereby there can be provided a material with physicochemical and electronic properties different from those of conventional materials. For example, when different metal ion-containing compounds are combined or fused, the resultant can show various electrical properties including insulating and conductive properties, and thereby can be used as a conducting material, a insulating material, a dielectric material, etc. Particularly, the continuous metal nanoparticle body using a semiconductor material can show a quantum size effect. It is possible that dot-, secondary particle-, or thin line-shaped nano materials are remarkably excellent in this effect.

By using a metal nanoparticle with magnetic properties or photosensitive properties, the product can be used as a next-generation magnetic memory material or a optical memory material. By controlling the refractive index of the metal nanoparticle, a thin film material with novel optical properties can be produced. Further, the continuous metal nanoparticle body can be a promising light emitting material. Furthermore, the thin film material comprising the metal nanoparticle capable of absorbing ultraviolet and visible lights can be a promising light energy capture or photoelectric conversion material.

When the support comprises a transition metal nanoparticle, a high-efficiency catalyst material can be developed. Further, the continuous metal nanoparticle body of the invention is excellent in mechanical properties, thermal stability, and chemical stability, and thereby is useful as a surface coating material utilizing the properties. It is possible that the continuous metal nanoparticle body of the invention is used for controlling wetting properties and molecule adsorption properties of a surface of a material.

The continuous metal nanoparticle body of the invention can be easily produced by the oxygen plasma treatment, etc. under the mild condition (room temperature), and thereby can be used as a substrate with various shape, surface, pattern, and area, and can be preferably used as a device substrate particularly.

The characteristics of the invention are described in more detail below with reference to Examples. In Examples, various changes may be made on materials, amounts, ratios, treatment details, treatment procedures, etc. without departing from the scope of the invention. Thus, Examples should not be considered restrictive.

EXAMPLE 1

A small piece of a lint-free cellulose sheet shown in FIG. 1, *a* to *c* (PS-2, Bemcot, 100% cellulose, available from Asahi Kasei Corporation) was soaked at 25° C. for 1 minute in an aqueous silver nitrate solution prepared by dissolving 0.0085 g of silver nitrate ($AgNO_3$) in 5 ml of an ion exchange water, and thereby was made completely wet. The resultant sheet was rinsed with an ion exchange water, and brought into contact with an aqueous sodium borohydride solution prepared by dissolving 0.0757 g of sodium borohydride ($NaBH_4$) in 10 ml of an ion exchange water for 10 minutes, to produce silver nanoparticles.

Figure 2:
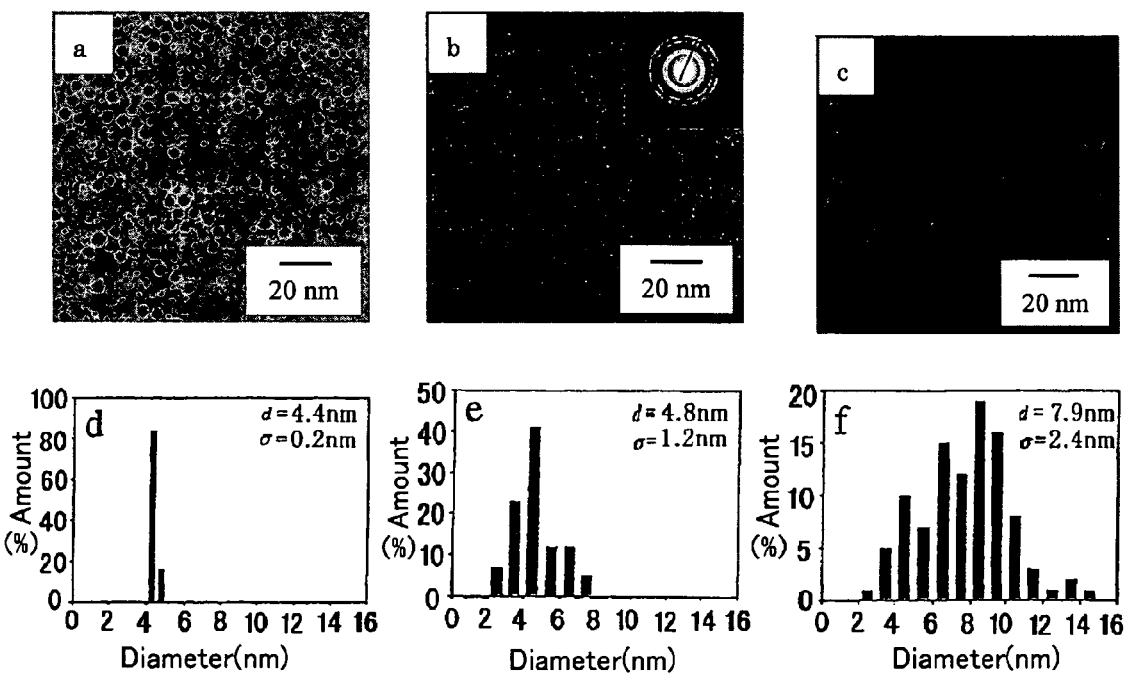
FIG. 2 shows transmission electron microscope images and particle diameter distribution diagrams of silver nanoparticles formed on the cellulose sheet of Example 1.
Figure 3:
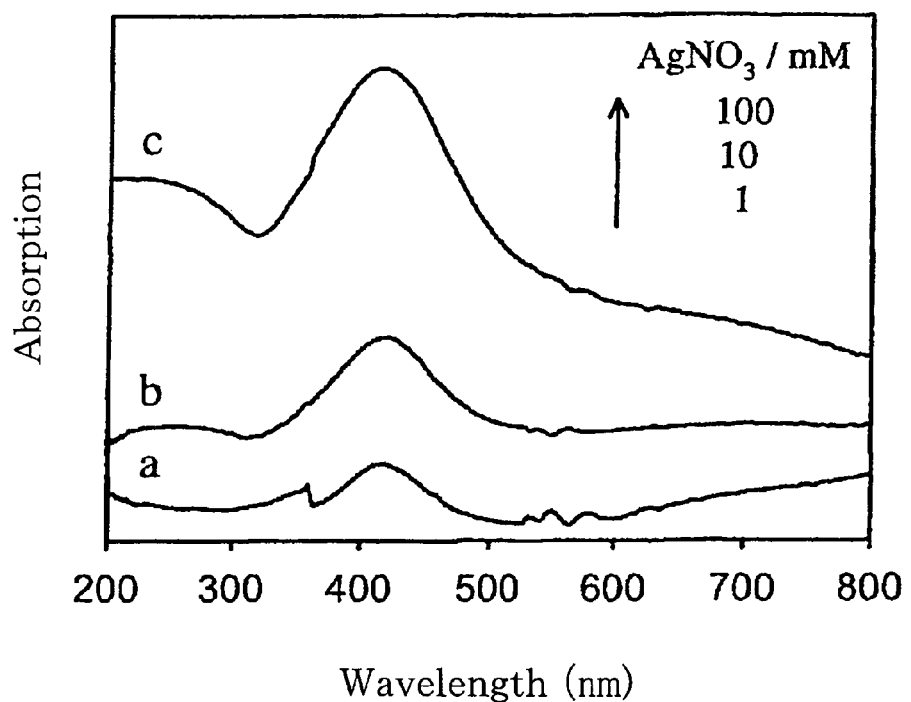
FIG. 3 is an explanatory diagram showing an ultraviolet-visible absorption spectrum of the silver nanoparticles produced in Example 1.

A transmission electron microgram and a particle diameter distribution diagram of the produced silver nanoparticles are shown in FIG. 2, *b* and *e*. The silver nanoparticles shown in FIG. 2, *b* had a bright yellow color, which was stable for a long period. Further, the silver nanoparticles had a uniform spherical shape, an average particle diameter d of 4.8 nm, and a standard deviation σ of 1.2 nm (see FIG. 2, *e*). An electron beam diffraction image of the silver nanoparticles comprised 5 rings corresponding to (111), (200), (220), (311), and (331) faces of metal silver cubic crystals as shown in an illustration of FIG. 2, *b*. An ultraviolet-visible absorption spectrum of the silver nanoparticles are shown in FIG. 3, *b*. A sharp peak of surface plasmon absorption of the silver nanoparticles was observed at 424 nm as shown in FIG. 3, *b*.

In an XPS spectrum of the sample, a C1s peak, which is a characteristic of carbon connected to oxygen in cellulose, was observed at 286.5 eV. The XPS and auger peak of silver were observed at 368.1 eV (3d2/5) and 1130.4 eV respectively, whereby the kinetic energy (MNN) of silver was estimated at 356.2 eV. The modified auger parameter was 724.3 eV, which approximately corresponded to 726.1 eV, the value of metal silver.

The above experiment was carried out in the same manner as above except for using a silver nitrate solution with a lower concentration (prepared by diluting above solution by 10 times) and a solution with a higher concentration (prepared by dissolving 0.0850 g of $AgNO_3$ in 5 ml of an ion exchange water), respectively. In the case of the lower concentration, the resultant silver nanoparticles had a smaller average particle diameter (d=4.4 nm) and a narrow dispersion (standard deviation σ=0.2 nm) (FIG. 2, *a*). On the other hand, in the case of the higher concentration, the resultant silver nanoparticles had a larger average particle diameter (d=7.9 nm) and a wide dispersion (standard deviation σ=2.4 nm) (FIG. 2, *c*). Further, in plasmon absorption, the lower concentration resulted in a more symmetric, sharper peak (FIG. 3, *a*), and the higher concentration resulted in a less symmetric, wider peak (FIG. 3, *c*).

Figure 4:
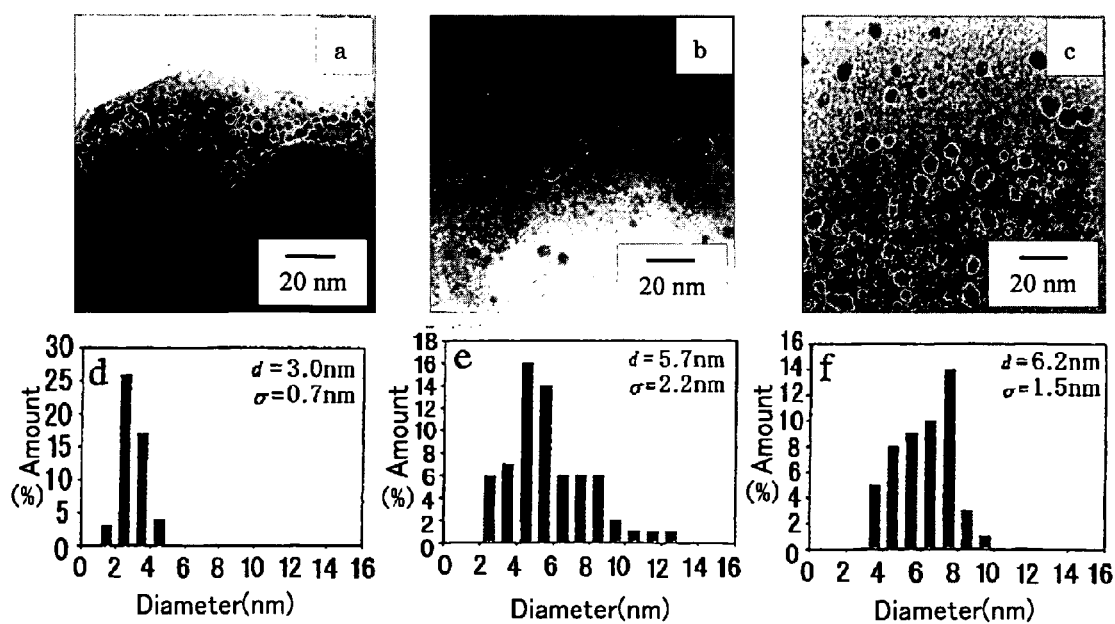
FIG. 4 shows transmission electron microscope images and particle diameter distribution diagrams of gold nanoparticles, platinum nanoparticles, and palladium nanoparticles produced in Example 1.

Further, the above experiment was carried out in the same manner as above except for using other noble metal nanoparticles of gold, platinum, and platinum, respectively. A 10 mM solution of each of gold trichloride ($AuCl_3$), platinum chloride ($PtCl_3$), and palladium chloride ($PdCl_3$) was used to produce metal nanoparticles in a cellulose fiber. The colors of the products were different, the gold nanoparticles had a pale pink color, the platinum nanoparticles were colorless, and the palladium nanoparticles had a grayish black color. In the XPS spectra of the metal nanoparticles, the bond energies of Au, Pt, and Pd were 83.8 eV (Au 4f7/2), 70.8 eV (Pt 4f7/2), and 334.9 eV (Pd 3d5/2) respectively, whereby it was clear that these nanoparticles were in the metal state. FIG. 4 shows the transmission electron microscope images and the size distributions of the metal nanoparticles contained in the cellulose fiber. The gold nanoparticles had a small size, an average particle diameter d of 3.0 nm, and a standard deviation σ of 0.7 nm (FIG. 4, *a*). The platinum nanoparticles had an average particle diameter d of 5.7 nm and a standard deviation σ of 2.2 nm (FIG. 4, *b*). And the palladium nanoparticles had an average particle diameter d of 6.2 nm and a standard deviation σ of 1.5 nm (FIG. 4, *c*).

EXAMPLE 2

Figure 5:
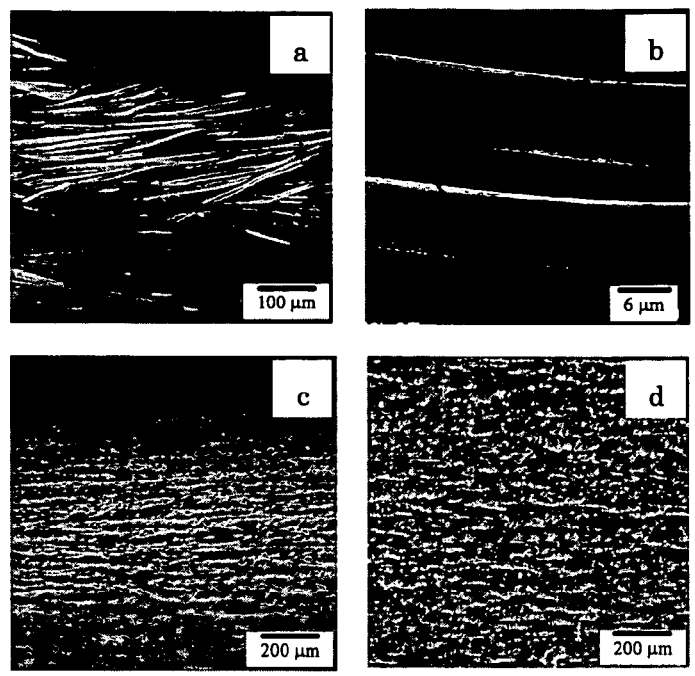
FIG. 5 shows transmission electron microscope images of a silk cloth and silk thread used in Example 2.

The above experiment was carried out in the same manner as Example 1 except for using a silk cloth and a silk thread as a substrate. The silk cloth comprised protein fibers of fibroin filaments, and was in a thin sheet shape with the intertwisted filament (FIG. 5, *a*). The silk thread was a twisted thread oriented in the axis direction (FIG. 5, *b*). The surfaces of the silk fibers were rough and had pores, so that the agents penetrated into the inner spaces.

A bundle of silk threads (available from Kanebo, Ltd.) was soaked at 25° C. for 1 minute in an aqueous silver nitrate solution prepared by dissolving 0.0085 g of silver nitrate ($AgNO_3$) in 5 ml of an ion exchange water, and thereby was made completely wet. The resultant bundle was rinsed with an ion exchange water, and brought into contact with an aqueous sodium borohydride solution for 10 minutes in the same manner as Example 1, to produce silver nanoparticles.

Figure 6:
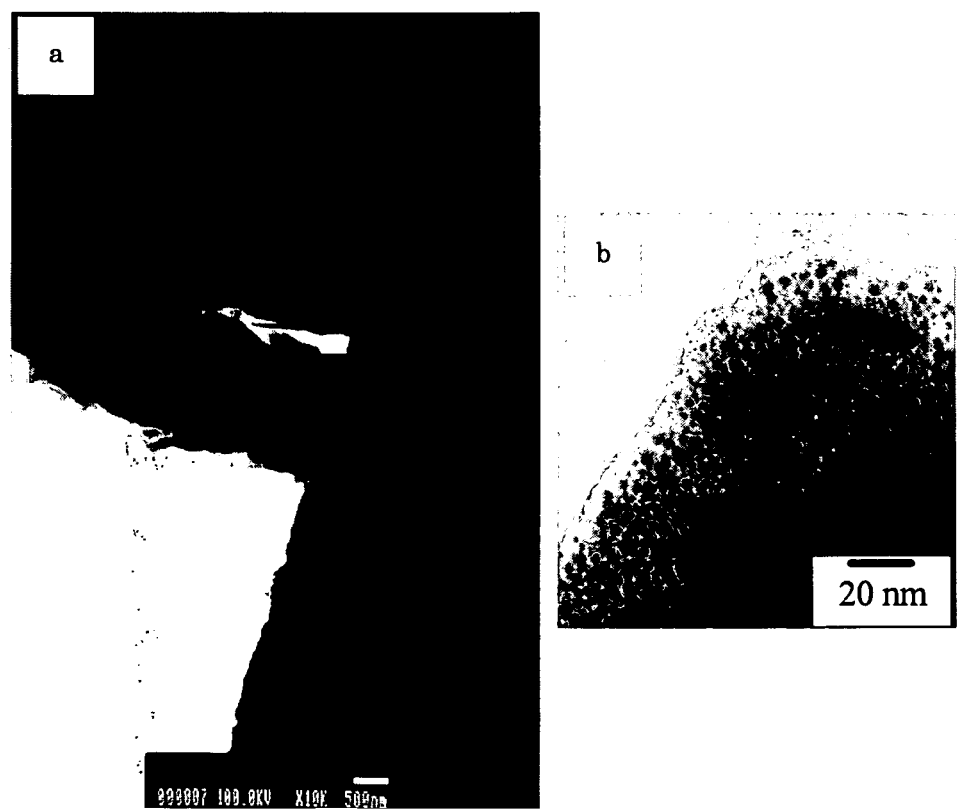
FIG. 6 shows transmission electron microscope images of silver nanoparticles formed on the silk fiber and silk thread of Example 2.

A transmission electron microscope image of the silver nanoparticles in the silk fibers is shown in FIG. 6, a, and the silver nanoparticles in the fibroin filaments of the twisted silk threads are shown in FIG. 6, *b*. The silk fibers and silk threads had a bright yellow color, which was stable for a long period. The silver nanoparticles formed in the filaments had a uniform spherical shape and diameters within a range of 3 to 3.6 nm.

EXAMPLE 3

Figure 7:
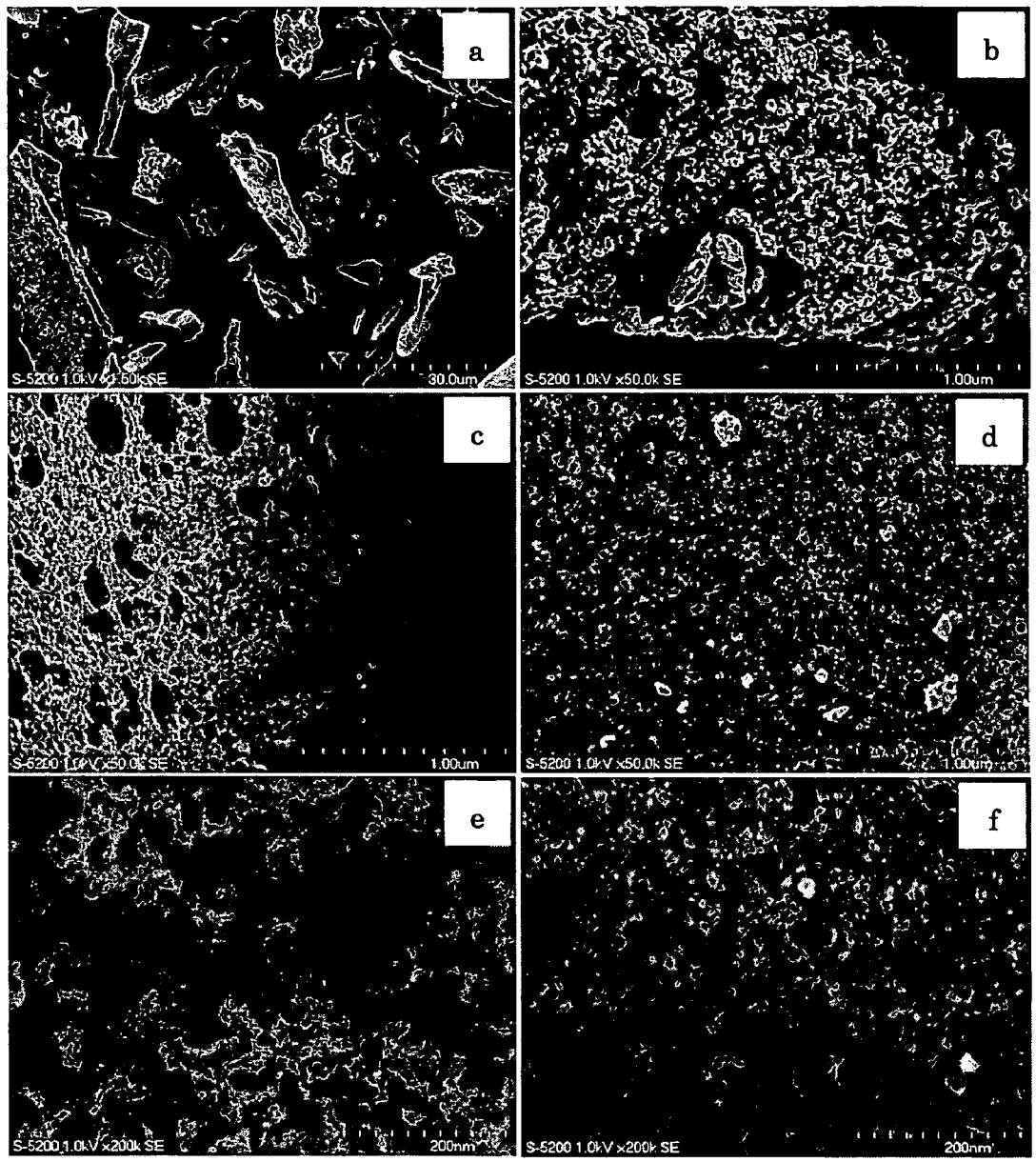
FIG. 7 shows transmission electron microscope images of charcoal powder used in Example 3.
Figure 8:
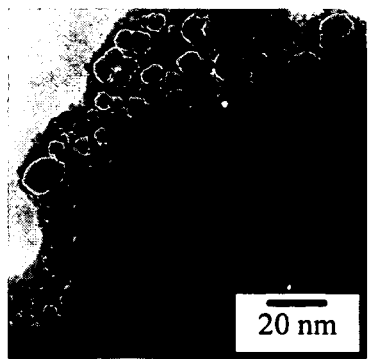
FIG. 8 shows a transmission electron microscope image of silver nanoparticles formed on the charcoal powder of Example 3.

The above experiment was carried out in the same manner as Example 1 except for using a charcoal powder (FIG. 7) as a support. A charcoal powder (available from Kanto Chemical Co., Inc.) was put in an aqueous silver nitrate solution (prepared by dissolving 0.0085 g of $AgNO_3$ in 5 ml of an ion exchange water) and stirred at 25° C. for 1 minute. The charcoal powder was recovered by a filtration, washed with an ion exchange water, and vacuum dried. The powder was brought into contact with the aqueous $NaBH_4$ solution of Example 1 for 10 minutes, subjected to a vacuum filtration, and further dried under reduced pressure for 8 hours. The resultant powder was grinded in a mortar and dispersed in water. The dispersion liquid was added to a copper mesh covered with silicon oxide (Silicon Monoxide Type A, Ted Pella, USA) dropwise, vacuum-dried for 8 hours, and observed by a transmission electron microscope. FIG. 8 shows the silver nanoparticles in the charcoal powder observed by the transmission electron microscope. The silver nanoparticles mostly had a spherical shape, and had an average particle diameter within a range of 3 to 15 nm.

EXAMPLE 4

Figure 9:
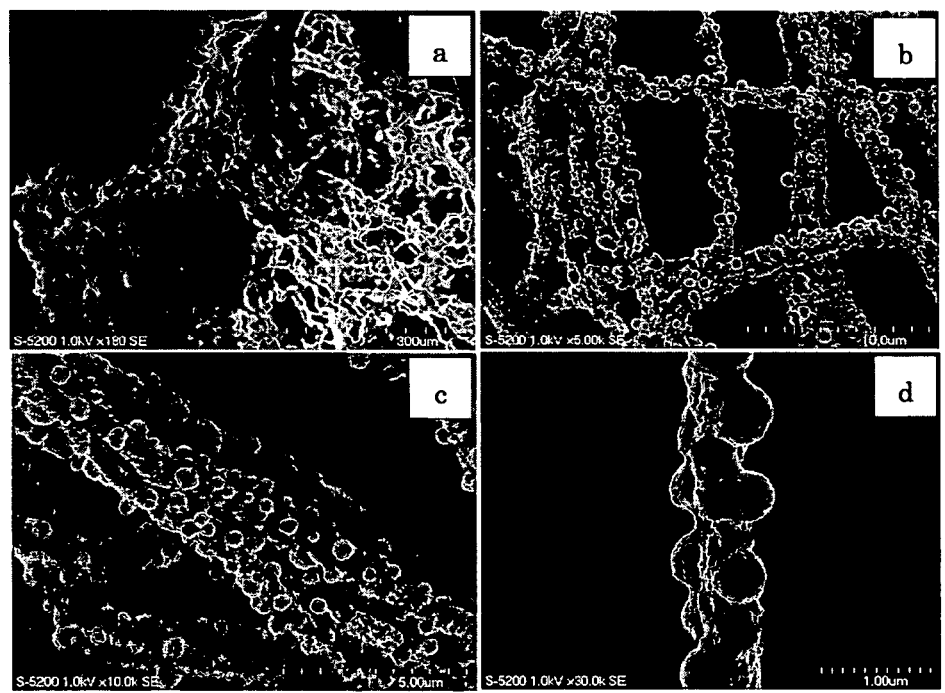
FIG. 9 shows scanning electron microscope images of a continuous silver nanoparticle body formed in Example 4.

The lint-free cellulose sheet having the silver nanoparticles produced in Example 1 was put in an electric furnace KDF-S70, heated from the room temperature to 450° C. over 3 hours, and maintained at the temperature for 3 hours. Then the resultant sheet was cooled to the room temperature, and the obtained sample was observed by a scanning electron microscope. FIG. 9 shows the scanning electron microscope images. As is clear from FIG. 9, *a*, the metallic fiber intertwist was maintained even after the burning. The continuous body (the network) of the silver nanoparticles was formed using the cellulose sheet as a mold as shown in the enlarged views of FIG. 9, *b* to *d*.

EXAMPLE 5

Figure 10:
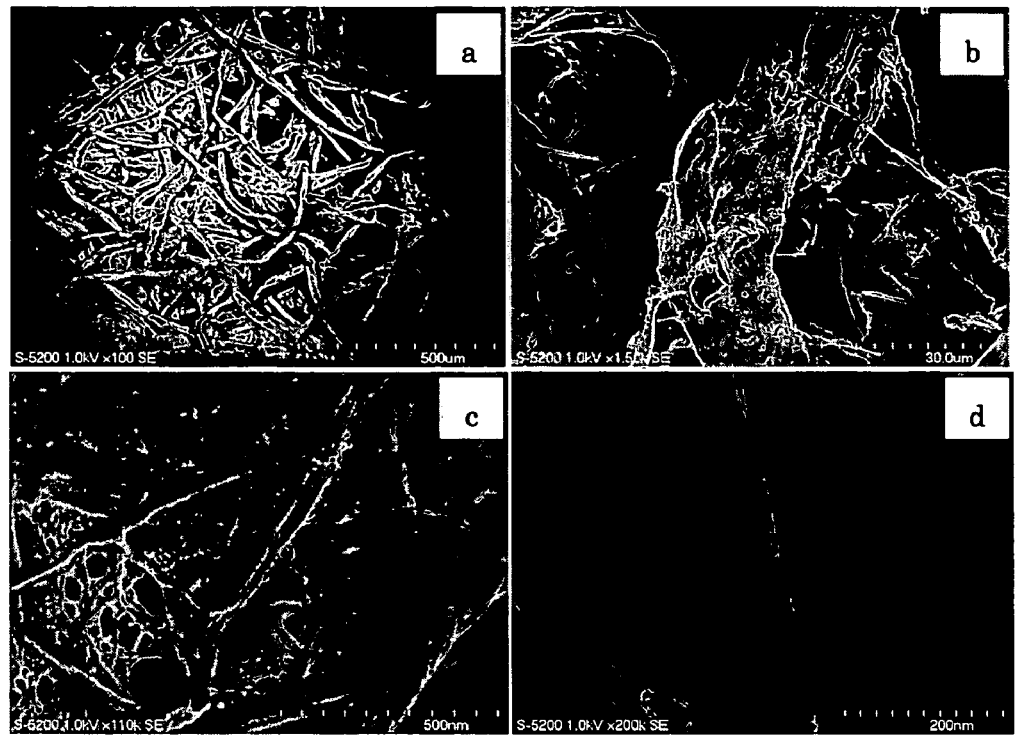
FIG. 10 shows scanning electron microscope images of a fine filter paper used in Example 5.
Figure 11:
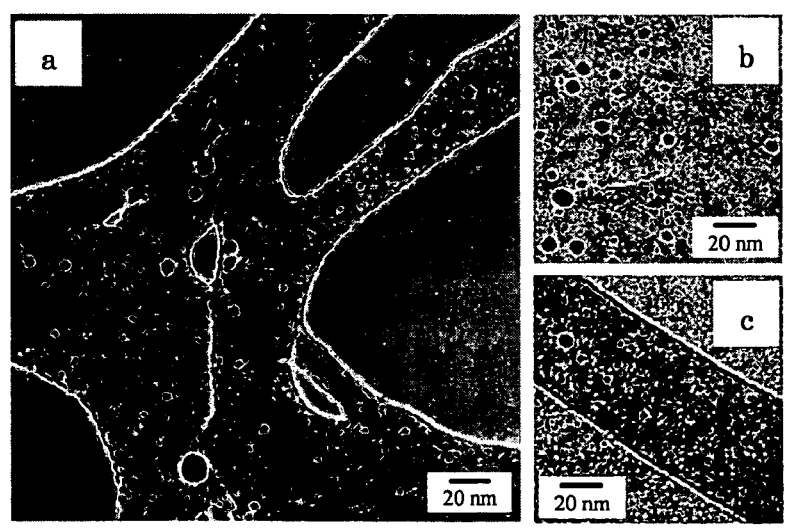
FIG. 11 shows scanning electron microscope images of silver nanoparticles formed on a cellulose fiber of the fine filter paper of Example 5.

The above experiment was carried out in the same manner as Examples 1 and 4 except for using a fine filter paper (Toyo Roshi Kaisha, Ltd.) as a mold. FIG. 10 shows scanning electron microscope images of the fine filter paper. As shown in FIG. 10, a part of the cellulose fibers in the fine filter paper was decomposed (FIG. 10, *a* to *c*), and microfibrils were observed (FIG. 10, *d*). A fine filter paper having silver nanoparticles was produced in the same manner as Example 1. FIG. 11 shows the silver nanoparticles contained in the cellulose fibers of the fine filter paper. In FIG. 11, a shows an interconnected microfibril structure containing the silver nanoparticles, b shows the silver nanoparticles in the connections, and c shows the silver nanoparticles in the single microfibril. The silver nanoparticles had an approximately spherical shape and an average particle diameter of 2 to 13 nm.

Figure 12:
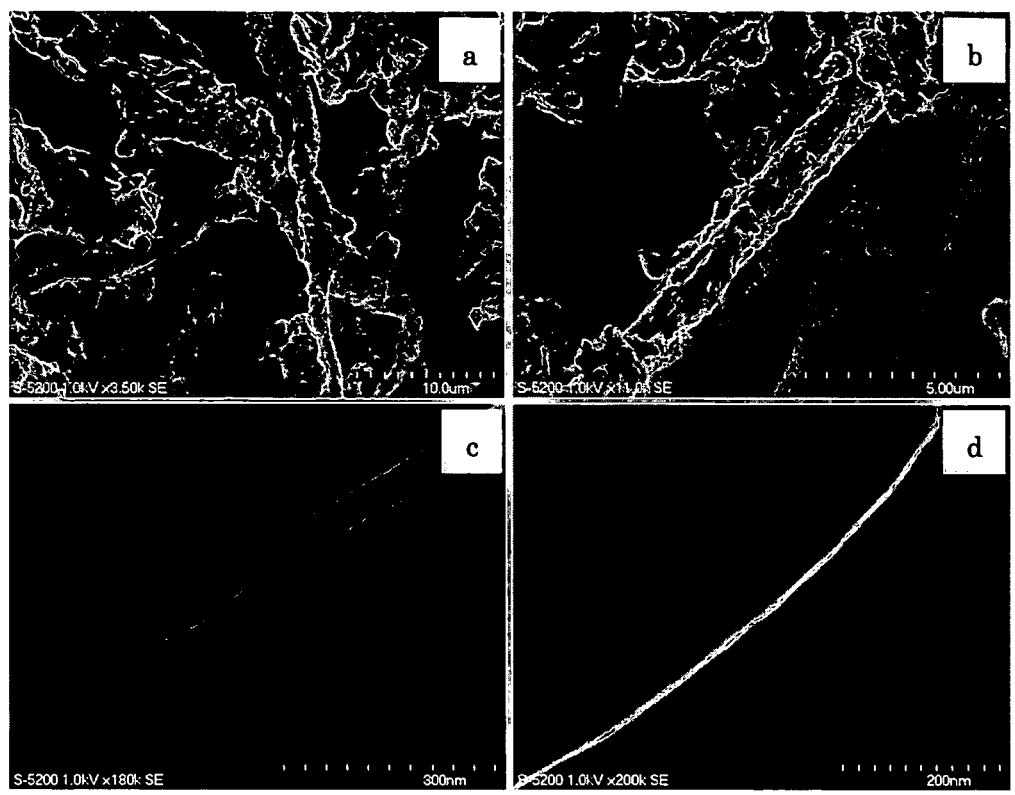
FIG. 12 shows scanning electron microscope images of a continuous silver nanoparticle body obtained in Example 5.

Then, the obtained sample was put in an electric furnace and heated gradually from the room temperature to 450° C. over 3 hours, to obtain a continuous silver nanoparticle body. FIG. 12 shows scanning electron microscope images of the resultant continuous silver nanoparticle body. It was clear from FIG. 12 that a wire-shaped, continuous silver nanoparticle body having a length of several micrometers to several tens nanometers was formed.

EXAMPLE 6

Figure 13:
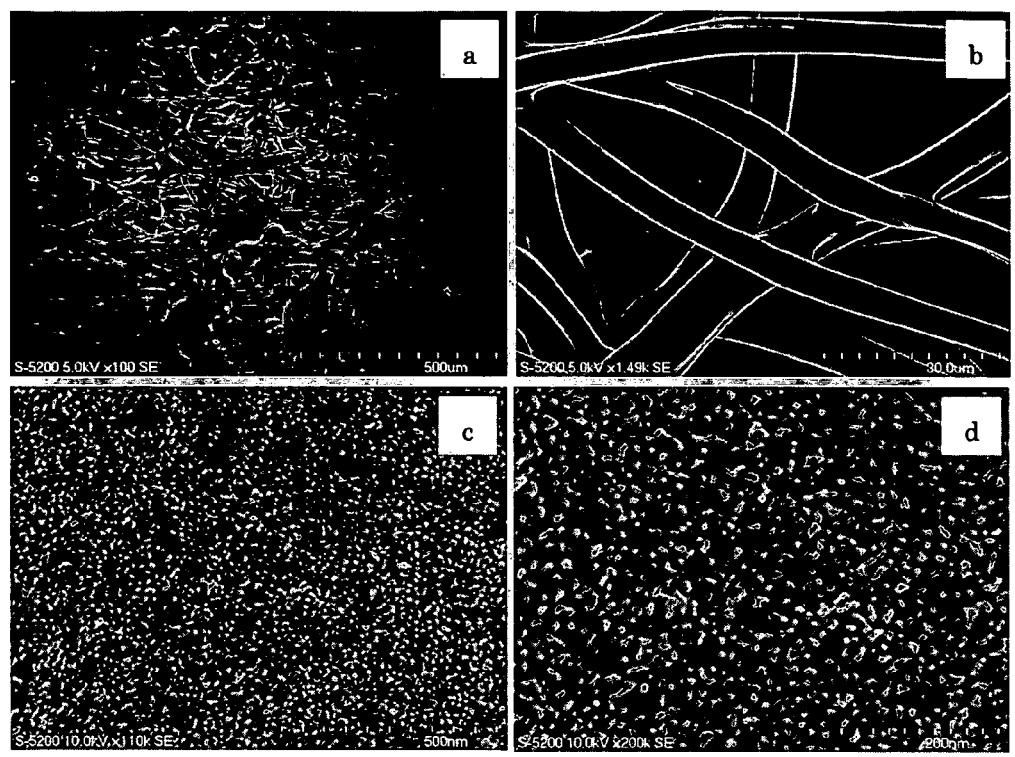
FIG. 13 shows scanning electron microscope images of platinum nanoparticles supported by a carbon film obtained in Example 6. (a) is a transmission electron microscope image of a section of the carbonized film, (b) is an enlarged image of the carbonized film (a part of the carbonized film), and (c) and (d) are enlarged images of the carbonized film (metal nanoparticles).

A small piece of a lint-free cellulose sheet (PS-2, Bemcot, 100% cellulose, available from Asahi Kasei Corporation) was soaked at 25° C. for 1 minute in an aqueous platinum (II) chloride solution prepared by dissolving 0.1348 g of platinum (II) chloride ($PtCl_4$) in 40 ml of an ion exchange water, and thereby was made completely wet. The resultant sheet was rinsed with an ion exchange water, and brought into contact with an aqueous sodium borohydride solution prepared by dissolving 0.30 g of sodium borohydride ($NaBH_4$) in 40 ml of an ion exchange water for 10 minutes, to produce platinum nanoparticles in the cellulose sheet. Then, the sample was put in a silica tube, heated to 400° C. at a rate of 10° C./minute while passing a nitrogen gas at 200 ml/minute, maintained at 400° C. for 30 minutes, and cooled in the air, to obtain a black film product. FIG. 13 shows scanning electron microscope images of the obtained film product.

As shown in FIG. 13, *a* and *b*, though the carbon film was slightly shrunk (the fiber diameter was reduced by about 26% and the film area was reduced by 66%) after the carbonization treatment, the original shape of the cellulose sheet was maintained. It was clear from the enlarged images of FIG. 13, *c* and *d* that the platinum nanoparticles of 4 to 10 nm were disposed on the surface of the carbon cellulose sheet.

Figure 14:
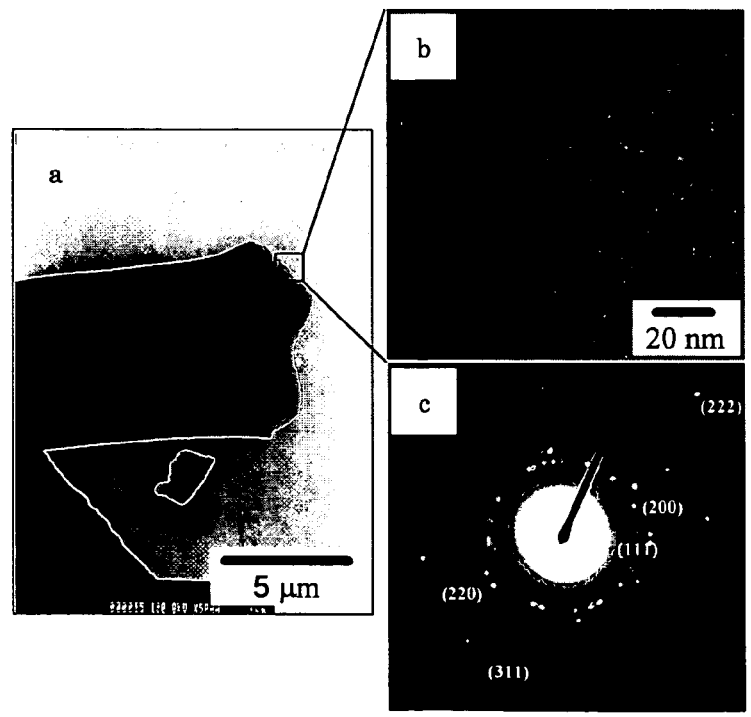
FIG. 14 shows transmission electron microscope images (a) and (b) and an electron diffraction image (c) of the platinum nanoparticles supported by the carbon film obtained in Example 6.

In FIG. 14, transmission electron microscope images of the platinum nanoparticles supported by the carbon film are shown in a and b, and an electron diffraction image is shown in c. It was clear from the transmission electron microscope image of FIG. 14, *b* that the platinum nanoparticles had particle diameters of about 4 nm. Further, as shown in the electron diffraction image of FIG. 14, *c*, the resultant platinum nanoparticles corresponds to a metal platinum cubic cluster.

INDUSTRIAL APPLICABILITY

In the method of the present invention, the metal ion-containing compound is adsorbed to the support comprising the organic material and then reduced, to obtain the supported metal nanoparticle. Thus, in the invention, the metal nanoparticle with the support of an easily-available, natural or synthetic, organic material can be inexpensively produced with ease. Further, by using the carbon support, the supported carbon metal nanoparticle having electrical conductivity can be easily produced.

Further, in the method of the invention, a plurality of the metal nanoparticles is subjected to at least one treatment selected from the oxygen plasma treatments, ozone oxidation treatments, and burning treatments to remove the support, using the support as a template or a pattern. Thus, in the method of the invention, the continuous metal nanoparticle body can be easily and inexpensively produced using the support as a mold, whereby a metal nanoparticle aggregate having desired diameter, shape, size, etc. can be produced with excellent accuracy by appropriately selecting the support. Furthermore, in the method of the invention, the used support can be completely decomposed or removed by the oxygen plasma treatment, etc., whereby there can be provided the metal nanoparticle aggregate with a high purity due to a cleaning effect of the oxygen plasma treatment, etc.

The invention claimed is:

1. A method for producing a continuous metal nanoparticle body, which comprises adsorbing a metal ion-containing compound to a porous support comprising an organic material (step A), reducing the adsorbed metal ion-containing compound to form metal nanoparticles on the support (step B), subjecting the support to a carbonization treatment, the carbonization treatment being carried out after step A so as to produce a carbonaceous solid support adsorbing and carrying the ion-containing compound thereon, or the carbonization treatment being carried out after step B so as to produce a carbonaceous solid support adsorbing and carrying the metal nanoparticles thereon, and removing the support to form a continuous metal nanoparticle body by at least one treatment selected from oxygen plasma treatments, ozone oxidation treatments, and burning treatments (step C).

2. The method according to claim 1, wherein the adsorbing step is carried out such that the support is soaked in a solution containing the metal ion-containing compound.

3. The method according to claim 1 or claim 2, wherein the metal ion-containing compound comprises a metal salt or a metal complex compound.

\* \* \* \* \*